United States Patent [19]
Feraboli et al.

[11] Patent Number: 6,079,324
[45] Date of Patent: Jun. 27, 2000

[54] VARIABLE CHAMBER ROUND BALER HAVING A BALE CORE FORMATION CHAMBER WITH A VARIABLE GEOMETRY

[75] Inventors: Antonio Feraboli, Via Bredina 6, Cremona, Italy, 26100; Vanni Caglieri, Cremona, Italy

[73] Assignee: Antonio Feraboli, Cremona, Italy

[21] Appl. No.: 08/983,124

[22] PCT Filed: Jun. 4, 1996

[86] PCT No.: PCT/IT96/00114

§ 371 Date: Jan. 6, 1998

§ 102(e) Date: Jan. 6, 1998

[87] PCT Pub. No.: WO97/03550

PCT Pub. Date: Feb. 6, 1997

[30] Foreign Application Priority Data

Jul. 24, 1995 [IT] Italy .................................. PM95A0505

[51] Int. Cl.[7] .................................................. A01F 15/07
[52] U.S. Cl. ............................... 100/40; 53/587; 56/341; 100/5; 100/88
[58] Field of Search ................... 100/1–5, 87–89, 100/40; 56/341; 53/118, 587

[56] References Cited

U.S. PATENT DOCUMENTS

| | | |
|---|---|---|
| 4,257,219 | 3/1981 | Burrough et al. . |
| 4,273,036 | 6/1981 | Kopaska . |
| 4,391,187 | 7/1983 | Koning et al. . |
| 4,433,619 | 2/1984 | Anstey et al. . |
| 5,025,718 | 6/1991 | Viaud et al. ............................... 100/88 |
| 5,134,839 | 8/1992 | Clostermeyer et al. .................. 100/88 |
| 5,152,123 | 10/1992 | Viaud et al. ................................ 100/4 |
| 5,450,704 | 9/1995 | Clostermeyer .............................. 100/5 |

FOREIGN PATENT DOCUMENTS

| | | |
|---|---|---|
| 0076502 | 4/1983 | European Pat. Off. . |
| 0102530 | 3/1984 | European Pat. Off. . |
| 0125719 | 11/1984 | European Pat. Off. . |
| 0228944 | 7/1987 | European Pat. Off. . |
| 0235356 | 9/1987 | European Pat. Off. . |
| 0264492 | 4/1988 | European Pat. Off. . |
| 0271390 | 6/1988 | European Pat. Off. . |
| 0339730 | 11/1989 | European Pat. Off. . |
| 0401581 | 12/1990 | European Pat. Off. . |
| 0432830 | 6/1991 | European Pat. Off. . |
| 0444762 | 9/1991 | European Pat. Off. . |
| 0497539 | 8/1992 | European Pat. Off. . |

*Primary Examiner*—Stephen F. Gerrity
*Attorney, Agent, or Firm*—Young & Thompson

[57] ABSTRACT

A variable chamber round baler having a bale core formation chamber with a variable geometry including a primary belt tensioner and a secondary belt tensioner, the primary belt tensioner begins to act only after the bale core has been completely formed; varying the initial geometry of the chamber and the compression program allows the formation of bales having different properties, such as a hard or soft core (with different diameters), a bale with constant density, etc.

22 Claims, 14 Drawing Sheets

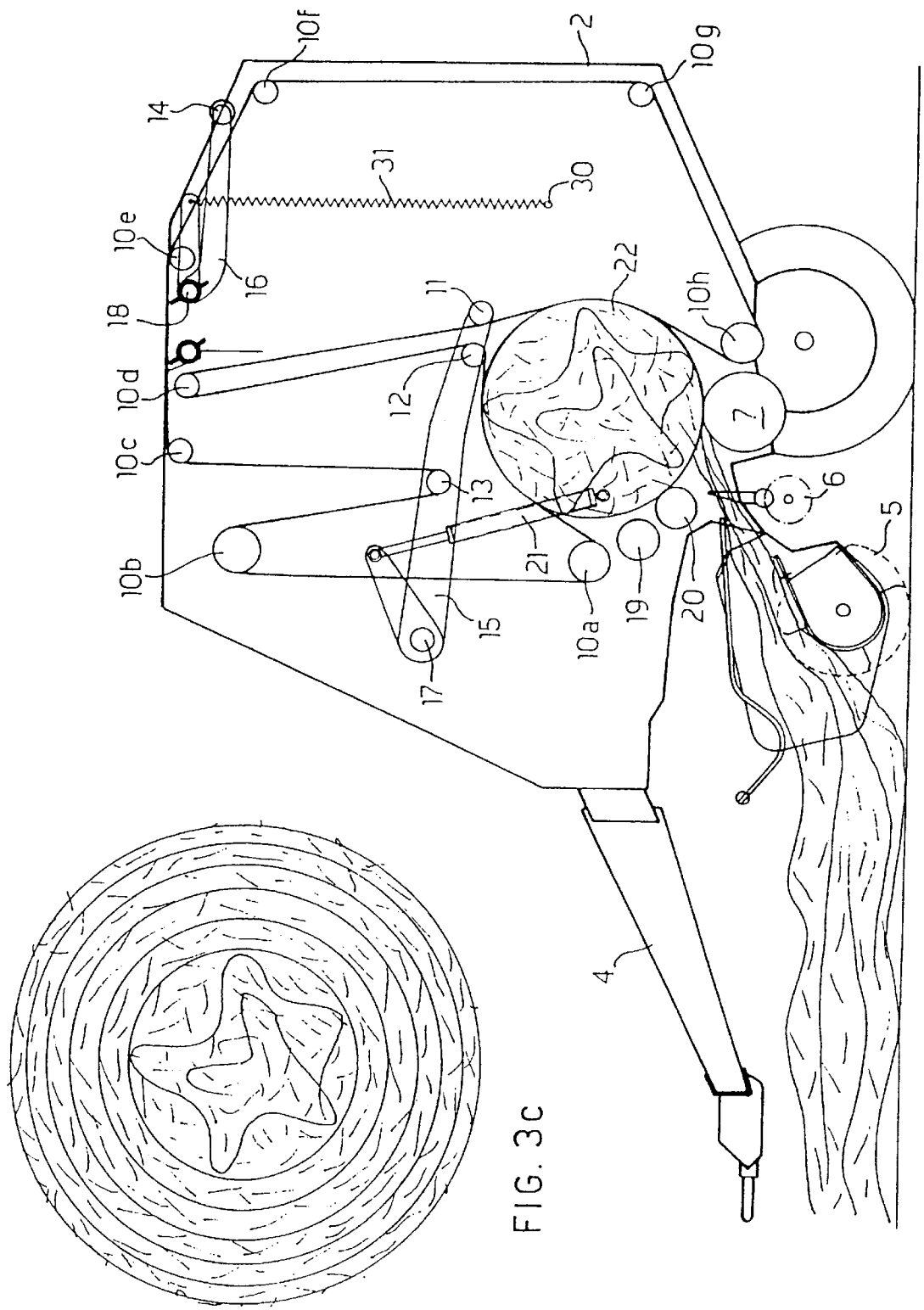

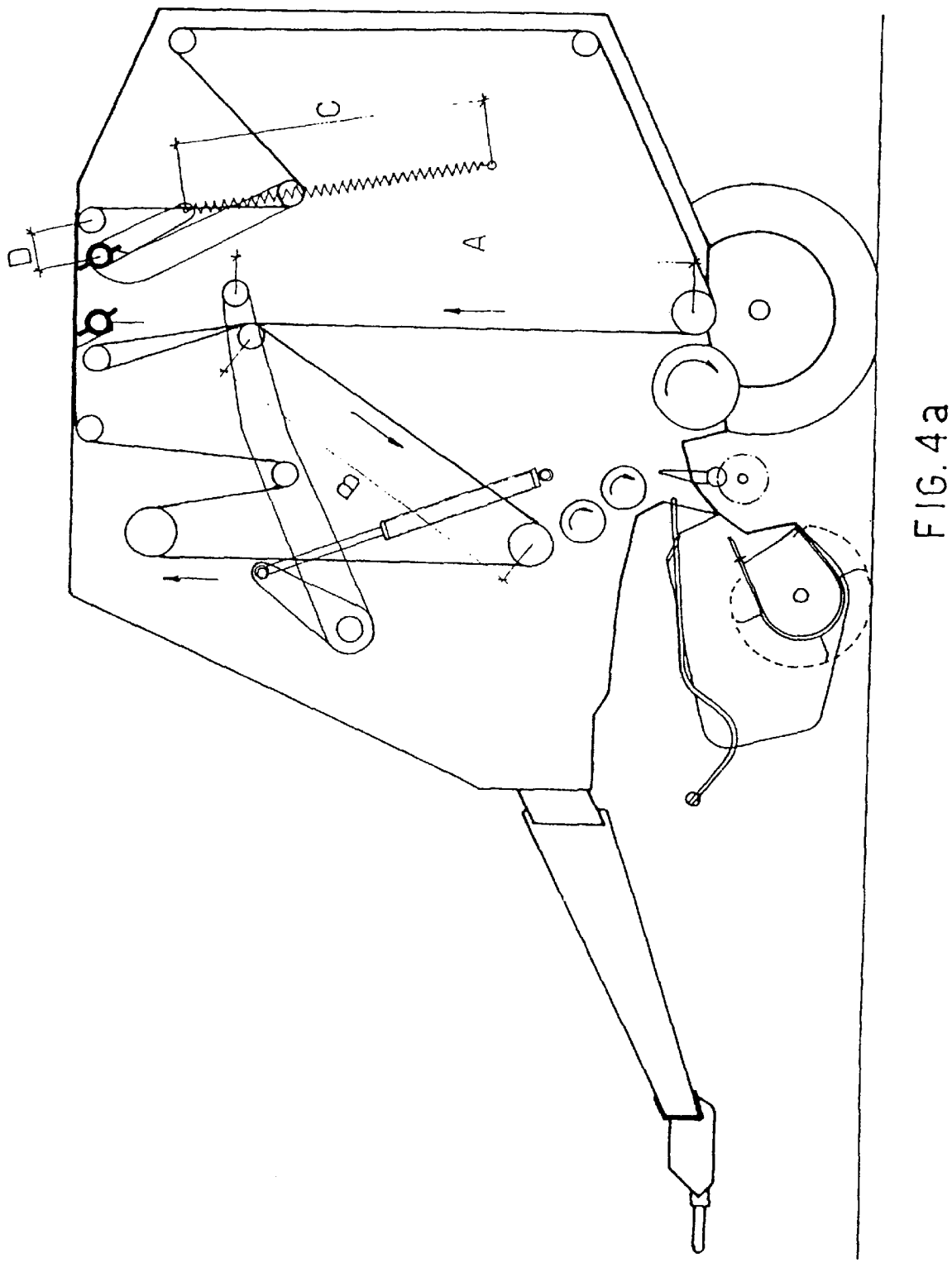

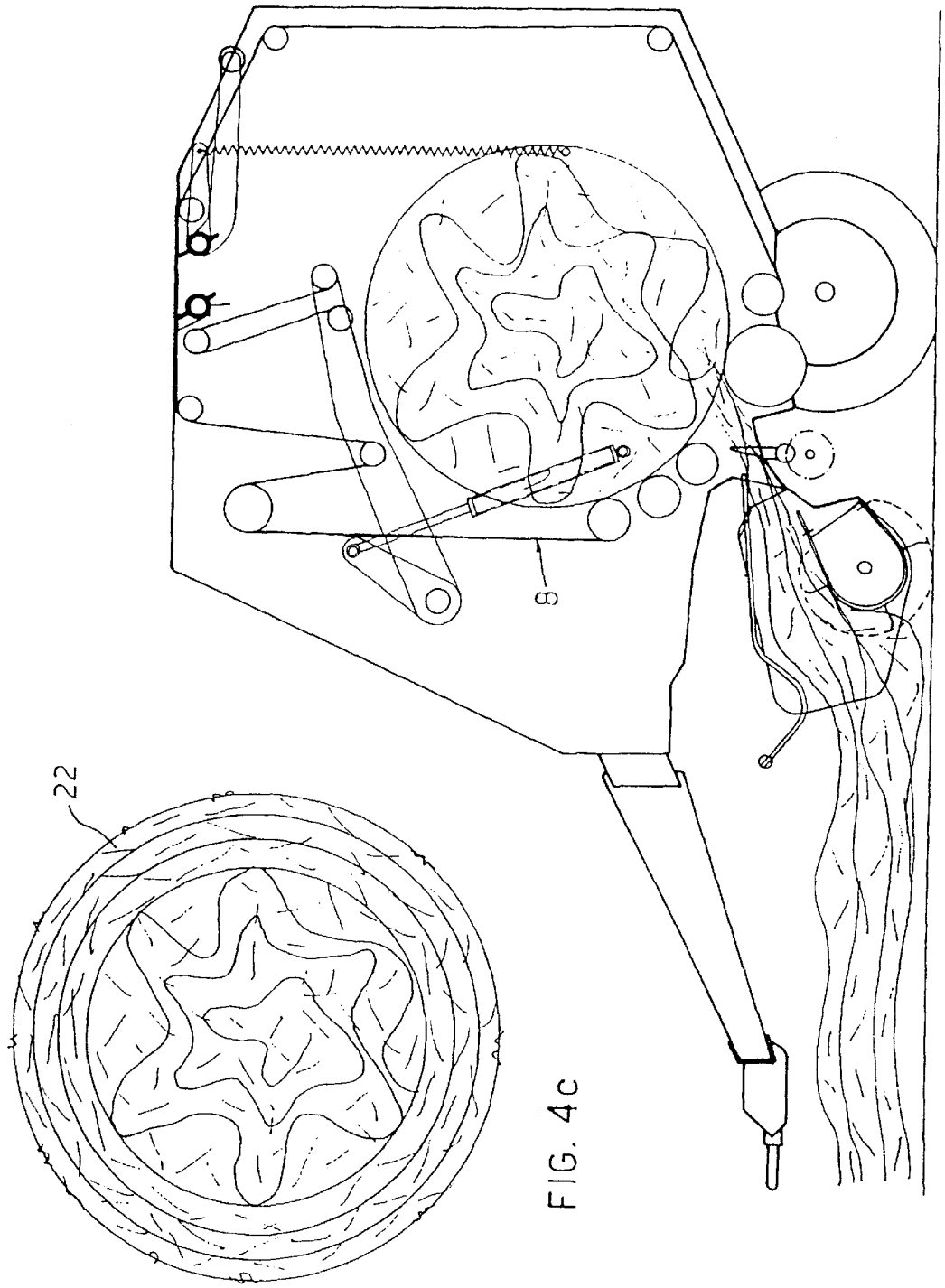

VARIABLE CHAMBER ROUND BALER HAVING A BALE CORE FORMATION CHAMBER WITH A VARIABLE GEOMETRY

FIELD OF THE INVENTION

The present invention relates to a round baler. A round baler is an agricultural machine for picking up and forming cylindrical bales of straw and silage, like maize plant, hay, grass or any other product which can be treated in this way.

Particularly, the invention relates to a round baler which is generally known as a variable chamber round baler for forming bales. Moreover, the invention relates to a baler with the feature that the bale core formation chamber has a geometry which can be modified automatically by the operator.

DESCRIPTION OF THE RELATED ART

It is known that balers may be classified in two distinct groups: the variable chamber balers and the fixed-chamber balers.

The variable chamber baler picks up the product which is arranged in windrows on the field, by means of a pickup and of supporting and feeding rollers or the like placed immediately after the pickup so that the product is conveyed towards the inside of the round baler.

One or more sets of belts or the like mounted on rollers which are partly fixed and partly movable through levers actuated by cylinder units are brought into contact with the product and transform its linear motion into a rotary motion.

The feature which distinguishes the variable chamber baler from the fixed-chamber round baler results from the fact that the bale formation space bound by the belts, at the time when the product is first introduced inside the baler, is only a fraction of the total volume enclosed within the machine body.

During the gradual formation of the cylindrical bale, the above-mentioned levers or arms which support the movable belt tightening rollers, are rotated, thereby allowing the expansion of the bale which is continuously in contact with the belts. The belts tension may be adjusted in order to vary the density of the cylindrical bale by acting on belt tightening systems which may be mechanical (springs) or hydraulic (cylinder units and pressure changing valves). Since the bale is continuously in touch with the tightened belts when it expands, starting from the formation of the core, a bale having a "hard" core is obtained. The "hard" core does not allow the passage of air and therefore more attention must be paid to the degree of product humidity.

The fixed-chamber baler has instead only stationary rollers, or fixed rollers for rotating belts, or chains provided with cross rods. Additionally, the bale compression starts only after the bale has reached a diameter such that it fills substantially the whole inner room of the machine as previously the bale is in contact with the compression means only on its lower surface.

The drawbacks of the fixed-chamber baler are due to the fact that the bales have a reduced weight/density, the bale diameter is previously set and may not be varied by the operator through the cab control means, and the power absorption is greater.

Of course the core will be soft, allowing the passage of air inside it, thereby promoting fermentation processes.

The patent EP-A-0 235 356 discloses a round baler which aims to solve the same problems of the present invention; that is, the formation of a constant density bale having a hard core, or a bale with a soft core and a denser outer surface.

However, the means for attaining these aims are totally different since in EP-A-0 235 356, in order to change over from an arrangement suited to form a soft core to one suited to form a hard core and vice versa, it is necessary to manually displace the action (or linked connection) point of the cylinder unit which resists the expansion of the bale. Moreover, in contrast with the arrangement of the present invention, the outer surface density is not controlled by the pressure of a hydraulic cylinder unit, but rather by a spring associated to a switch which is triggered when the bale has reached a predetermined size. The patent EP-0 125 719 discloses a system which prevents belts from breaking, by a circular arrangement of rollers defining the final shape and diameter of the bale.

EP-0 102 530 proposes to solve other problems, and particularly it discloses a system which avoids clogging of the aperture where the product is picked up by means of a device (directly operated by the user from the cab), which lifts up a pair of arms defining the bale formation chamber.

U.S. Pat. No. 4,273,036 discloses a round baler in which a primary belt tensioner and a secondary belt tensioner are provided with collars having rollers, whose displacement allows, with merely mechanical means, a compression of the bale at approximately constant pressure until the formation of the bale is complete. It is not possible to gradually increase the pressure in order to obtain a bale with a hard core and a uniform density.

EP-0 497 539 A1 discloses a manually operated adjustment system of the size up to that of the bale formation chamber. In this case it is not possible to speak of a primary belt tensioner and a secondary belt tensioner as an arm serves to adjust the size of the core formation chamber and only one belt tightener is provided, located in the rear part of the round baler.

SUMMARY OF THE INVENTION

An object of the present invention is to eliminate the disadvantages of one and the other kind of baler by providing an adaptable machine which may be used to from bales having a hard or a soft core, wherein the soft core may have different diameter, and which may therefore be employed for any kind of product regardless of its humidity conditions.

Another object of the present invention is that of providing a baler which does not require manual work by the user in defining the initial geometry of the chamber, thus avoiding the assembling or disassembling or adjustment of mechanical parts in order to adapt the baler to the desired kind of operation such as formation of a bale with a great or small diameter, with a hard or soft core, with an outer surface which is made impervious by a greater compression thereof, etc.

Another object of the present invention is that of providing various compression programs:

compression performed with a constant pressure during the whole process, starting from a hard or soft core;

compression performed with a gradually increasing pressure, starting from a hard or soft core, in particular if the core is hard, it is possible to obtain a constant density of the bale; and compression performed by setting an initial value and a final value of the pressure which acts starting from a predetermined adjustable diameter (the core being soft or hard).

According to the present invention, it is indeed possible by acting on push-buttons or small levers or parts which are sensitive to the touch located on the electronic command monitor to automatically modify the position of the cylinder units which determine the initial geometry of the core formation chamber and to choose one of the three compression programs.

BRIEF DESCRIPTION OF THE DRAWINGS

The present invention will now be described for illustrative and non-limitative purposes, by means of two preferred embodiments thereof, which are illustrated in the drawings, wherein:

FIG. 3b is a sectional view analogous to FIG. 3a, illustrating the process of bale formation, in the case of a soft core with an intermediate diameter;

FIG. 3c is a sectional view of a bale having a soft core with an intermediate diameter;

FIG. 4a is a sectional view of the round baler in which the machine's initial arrangement allows the formation of a bale having a soft core with a larger diameter;

FIG. 4b is a sectional view of the round baler of FIG. 4a, showing the process of bale formation in the case of a bale with a large-diameter soft core;

FIG. 4c is a sectional view of a bale with a large diameter soft core;

DESCRIPTION OF THE PREFERRED EMBODIMENTS

Figure 1A:
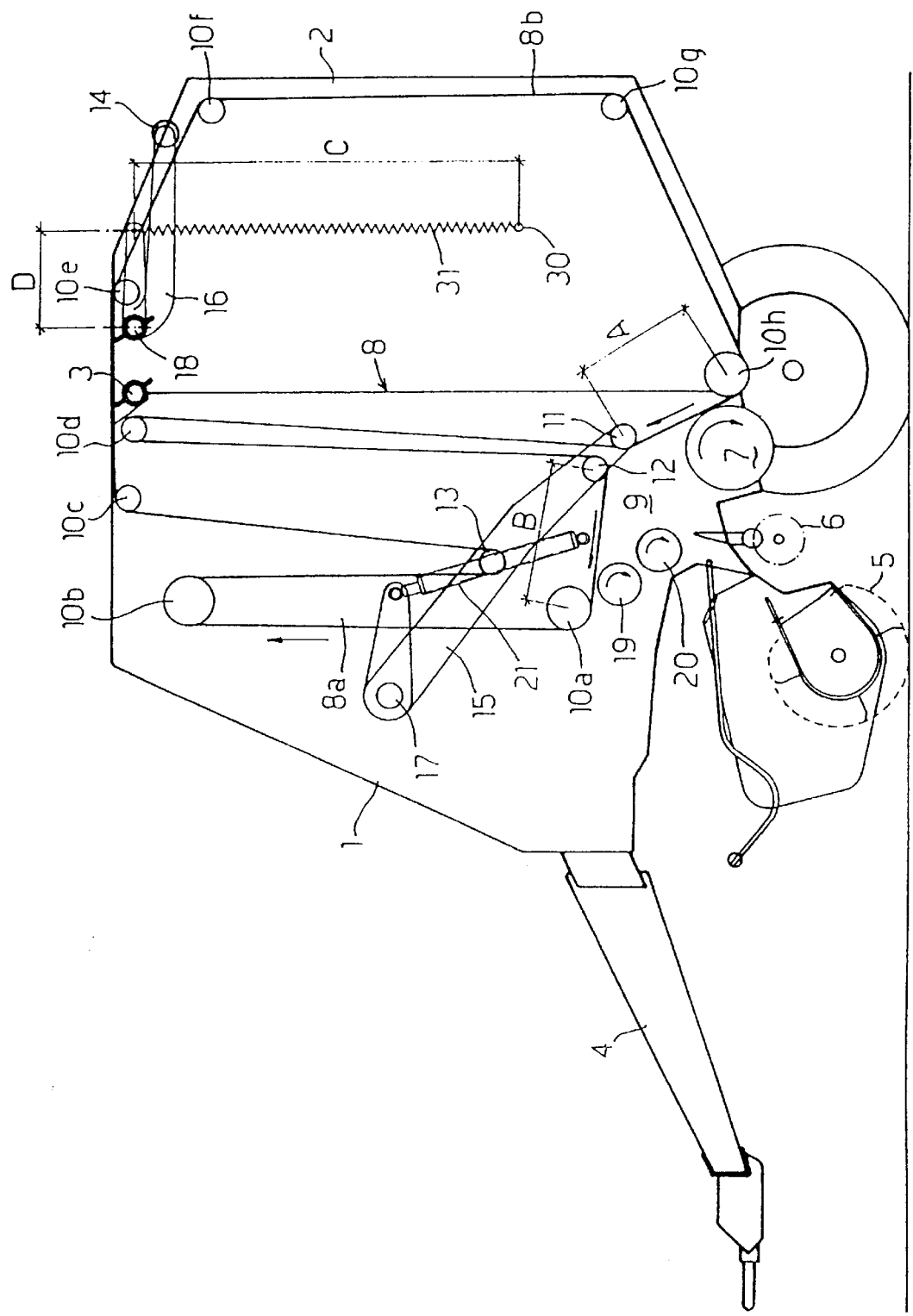
FIG. 1a is a schematic lateral and sectional view of the round baler of the present invention in the condition allowing the formation of a bale with a hard core.
Figures 1B, 1C:
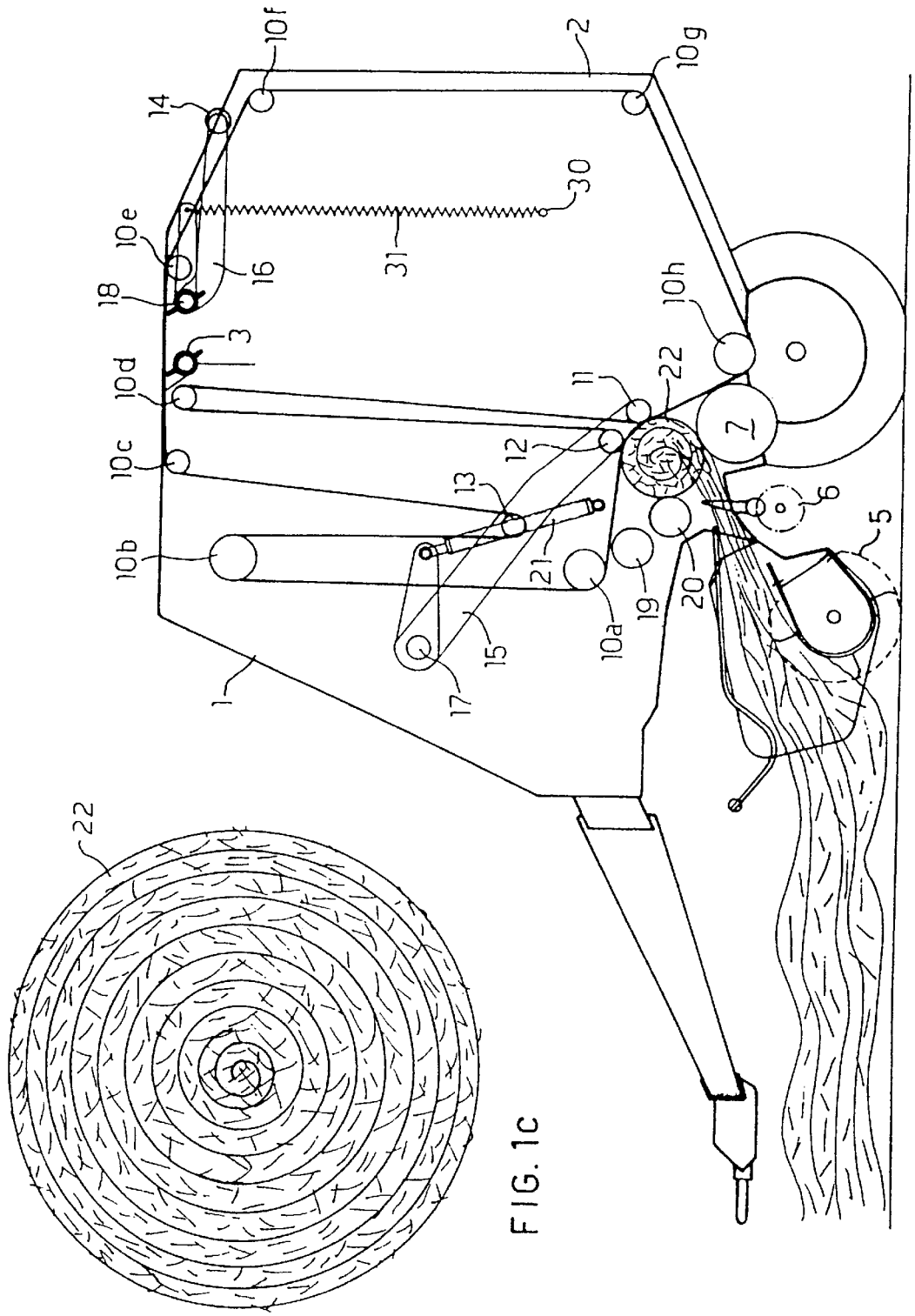
FIG. 1b is a view analogous to FIG. 1a, showing the bale starting in the case of a bale with a hard core.
FIG. 1c is a sectional view of a bale with a hard core.

In the figures, numeral 1 denotes the baler body or frame which is closed on its rear portion by a tailgate 2 hinged on a horizontal axis 3. The opening of the tailgate 2 is performed by hydraulic cylinder units or equivalent devices.

The cab command monitor of the drawing vehicle indicates the locking condition of the tailgate after its closing once the bale has been discharged by the bale ejector (not shown).

The baler comprises drawing means 4 and power transmission means transmitting power from the tractor to the baler which are of any known kind (not shown).

Moreover, in the lower front part there is provided a pickup 5. The numeral 6 indicates a conveyor for feeding the silage or straw towards the inside of the frame 1. The conveyor 6 cooperates with a floor roll 7 in order to feed the product, the roll starting the curling of the product inside the chamber 9 by cooperating with the belts 8. The components 6, 7 may be replaced by any other group of known mechanical feed parts. For instance, some balers make use of rollers which transmit the motion to belts acting like belt conveyors.

The bale core formation chamber 9 is bounded by the set of belts 8 which is wound around a plurality of stationary rollers 10a, b, c, d, e, f, g, h, some of which are mounted inside the tailgate 2 and others on the front stationary part of the frame 1.

The belts 8 are moreover wound around belt tightening rollers 11, 12, 13, 14, the first three of them being mounted on two belt tightening arms 15, one on each side of the baler, while the fourth one is mounted on two arms of a second belt tensioner or subordinate belt tensioner 16. The main arm or belt tensioner 15 is rotatable around the axis 17, whereas the subordinate arm or belt tensioner 16 is mounted on the axis 18.

The two belt sections between the stationary transmission roller 10d and the movable belt tightening rollers 11, 12 move in opposite directions and they substantially separate the set of belts 8 in two sections 8a, 8b inside the frame 1. The bale core formation chamber 9 is also bound by two other stationary rollers 19, 20 which are driven in order to form the bale core. The rollers driven by the PTO (power take-off) are the rollers 10a, 10b, 7, 19 and 20. The others are idle rollers.

According to one embodiment of the invention, the belt tightening arm 15 is actuated by two double-acting hydraulic units 21, which are located on two opposite sides of the machine. The hydraulic units 21 move the belt tightening arm 15 to a definite position, defining a certain geometry and dimension of the bale core formation chamber 9. Moreover, the hydraulic units 21 oppose a resistance to the upward rotation of the arm 15, thereby exerting a traction on the belts which surround the bale 22 due to the expansion of the bale 22 itself.

The traction on the belts 8 is transmitted in the first place through the belt tightening roller 13 which must, however, lift itself in order to provide the necessary amount of belt length to allow the formation of the bale. The pressure exerted by the hydraulic units 21 is adjusted by a valve which is actuated by the electronic control unit so that at any instant of time during the bale formation its compression is adjustable according to three compression programs described hereinafter.

In FIG. 1a, the primary or first belt tensioner 15 is arranged in its lowest position so that the bale core formation chamber 9 has a minimum size and the two belts sections A and B have a minimum length. In this arrangement, a "hard" core will be formed. Since the belts 8 are noticeably stretched and the sections A and B are very short, these two conditions obviously cause a large compression of the product from the very beginning of the bale starting process. Moreover, a further tension on the belts 8 will be caused by the secondary belt tensioner 16 whose spring 31 fixed to the tailgate 2 at the point 30 exerts a maximum tensile stress since in this condition the second belt tensioner 16 is completely in its lifted position (position in which the roller 14 is tangent to the belts) and the length of the spring is greatest.

Furthermore, the moment of the force of the spring 31 about the axis 18 is greatest (length D). Therefore, the second baler of the invention may be used to form a "hard" core.

Figure 2A:
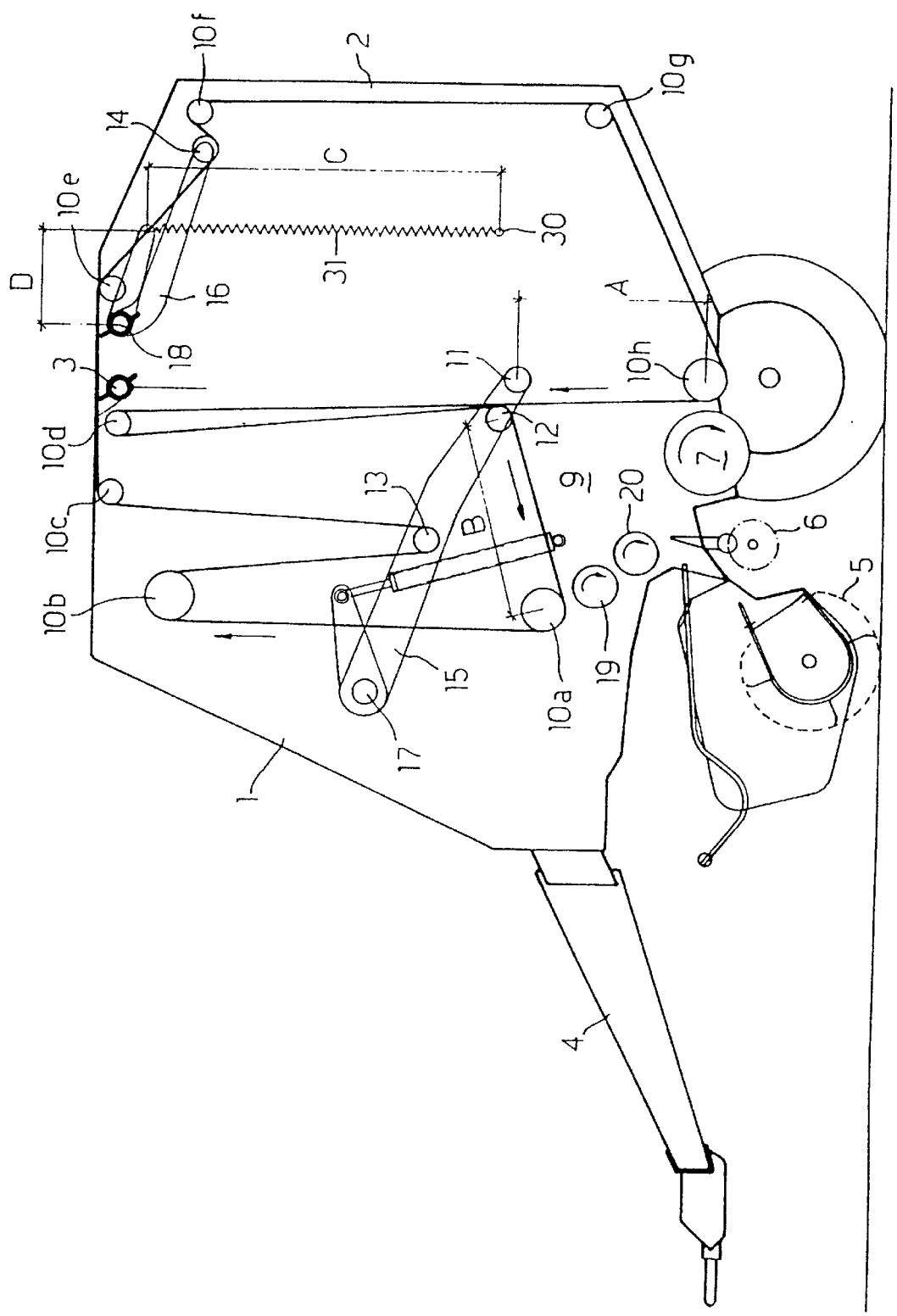
FIG. 2a is schematic lateral and sectional view of the round baler in the condition allowing the formation of a bale having a soft core with a small diameter.

Alternatively, with reference to FIG. 2a, it may be noticed that the sections A and B are longer than those of FIG. 1a since the arm 15 is lifted in this arrangement and the size of the bale core formation chamber is greater. In this case the product will exert a pressure on the two belt sections A and B which have a larger length, thus causing first only the lifting of the second belt tensioner or arm 16, as shown in FIG. 2b, and only afterwards the lifting of the first belt tensioner or arm 15.

In the first phase, the effect to the first belt tensioner 15 is totally cancelled. That is, the compressive action on the bale is exerted by the second belt tensioner 16, whose tensile stress on the belts 8 must be only large enough to avoid their slipping on the rolls.

The product which comes into contact with the belts immediately after entering, is compressed with a smaller force until the secondary tensioner or arm 16 is lifted (FIG. 2b) since the action of the primary belt tensioner (which causes a greater compression of the bale) is temporarily cancelled, and moreover since the sections A and B are longer and the tensile stress of the spring 31 lower than in the case of FIG. 1a (in FIG. 2a the spring is less stretched), and lastly since the torque around the axis 18 (given also by the length D of FIG. 2a) is lower. Then, the round baler will provide a bale 22 having a "soft" core.

Figures 2B, 2C:
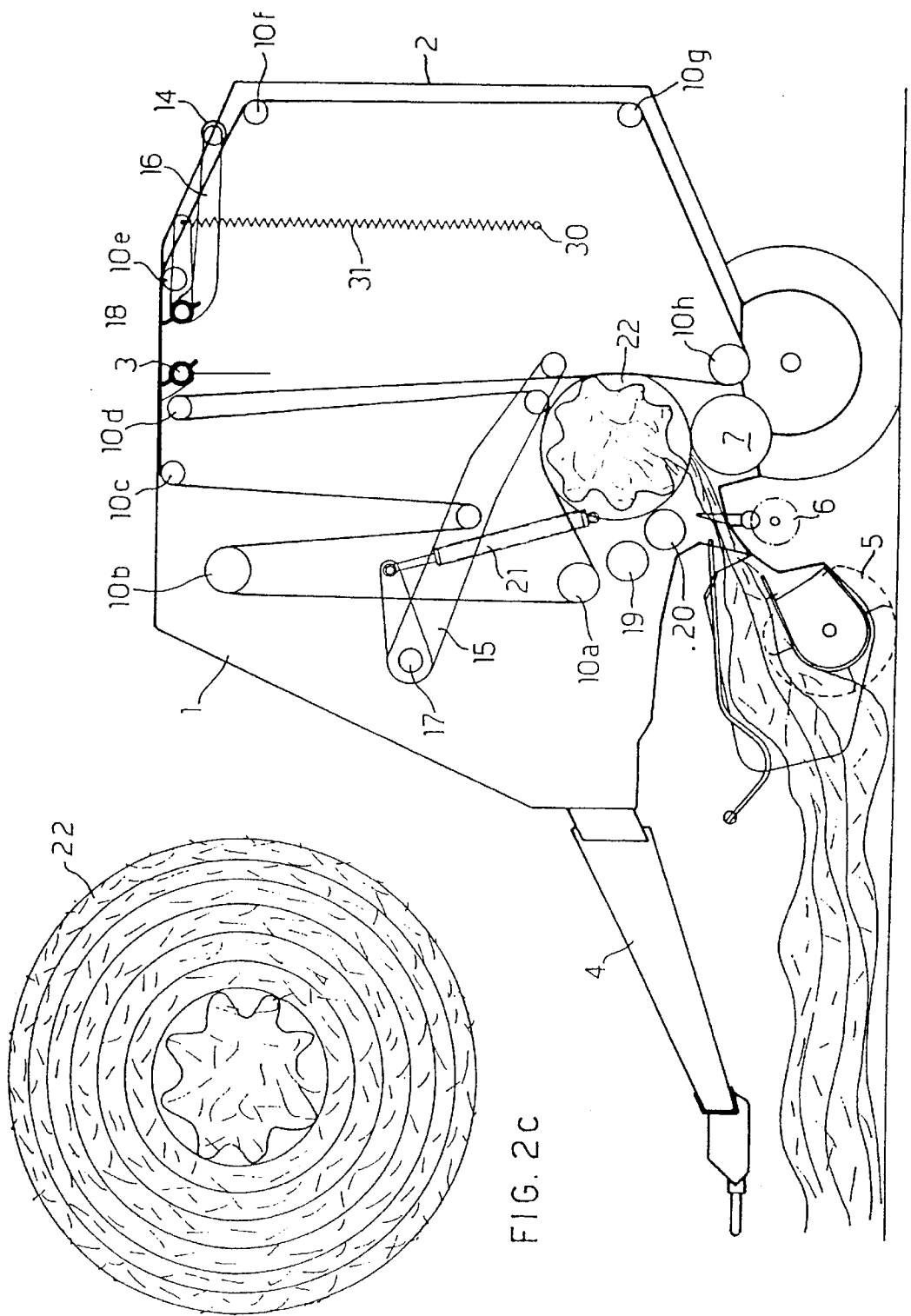
FIG. 2b is a view analogous to that of FIG. 2a, showing the formation of a bale having a soft core with a small diameter.
FIG. 2c is a sectional view of the bale having a soft core with a small diameter.

This is schematically shown in FIG. 2c, which illustrates the characteristic "star" of a bale with a "soft" and small diameter core.

The above statements may be repeated for the case of FIGS. 3a, 3b and 3c or 4a, 4b and 4c.

Figure 3A:
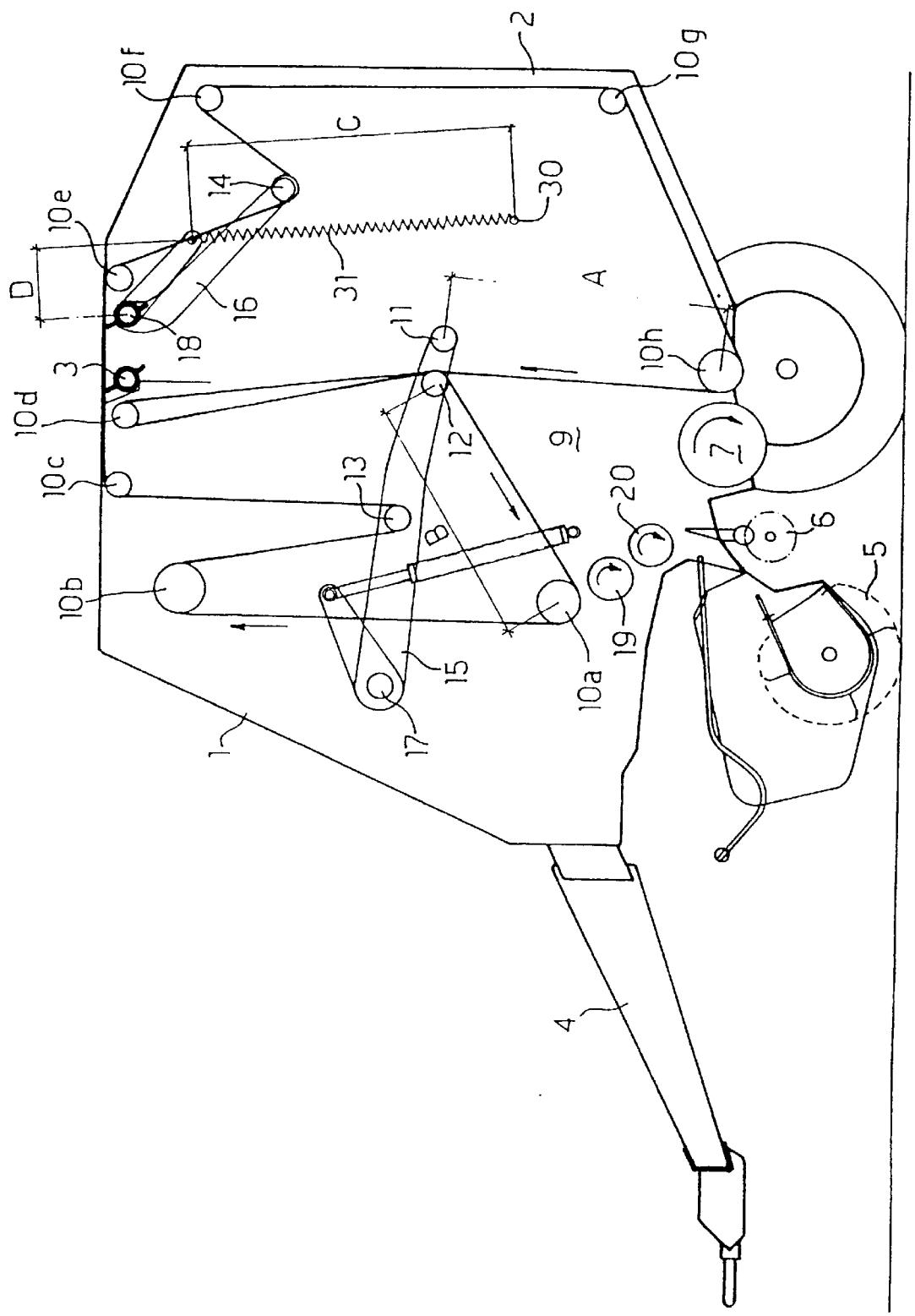
FIG. 3a is a sectional view of the round baler, in the arrangement allowing the formation of a bale having a soft core with an intermediate diameter.

In FIG. 4a, A and B are longer than in the case of FIG. 3a so that the preset size and geometry (from the cab) of the chamber 9, will be used, in each case, to form a "soft" core with an intermediate diameter (FIG. 3a), or a "soft" core of large diameter (FIG. 4a), or even a "soft" core of small diameter (FIG. 2a).

Obviously, it may be conceived to provide a number of possible presettings of the volume of the chamber for forming a "soft" core, which exceeds three.

The greater the bale core formation chamber, the smaller will be the pressure exerted on the product since the sections A and B will be longer and the length D smaller. Therefore, to form a bale with a soft core, it is necessary to adjust the position of the first belt tensioner 15, using electric, electronic, mechanical systems and so on, and possibly the hydraulic circuit of FIG. 6 described hereinafter. However, in order to stretch the belts 8 it is necessary to provide the second belt tensioner 16 since the roller 13 is no longer in its position as shown in FIG. 1a (presetting corresponding to the formation of a hard core) in which it applies a tensile stress on the belts 8. When the chamber 9 is full, the bale starts to push both belt sections A, B overcoming only the force of the spring 31 of the second belt tensioner 16. Only after the secondary belt tensioner 16 has reached the maximum level (FIGS. 2b, 3b, 4b), the hydraulic pressure of the two hydraulic units 21 of the primary belt tensioner 15 begins to act, and this pressure may be adjusted according to three programs which can be preset by the operator, for instance to form a dense and impervious layer as will be described in the following.

By setting each time the initial and final angular positions of the arm 15, and varying the temporary hydraulic pressure of the hydraulic cylinder units 21, will make it possible to obtain bales with different properties and sizes.

A plurality of stops (like pins or axes inserted into appropriate holes) may replace the automatic positioning of the hydraulic units 21 performed by means of the hydraulic circuit.

Figure 5A:
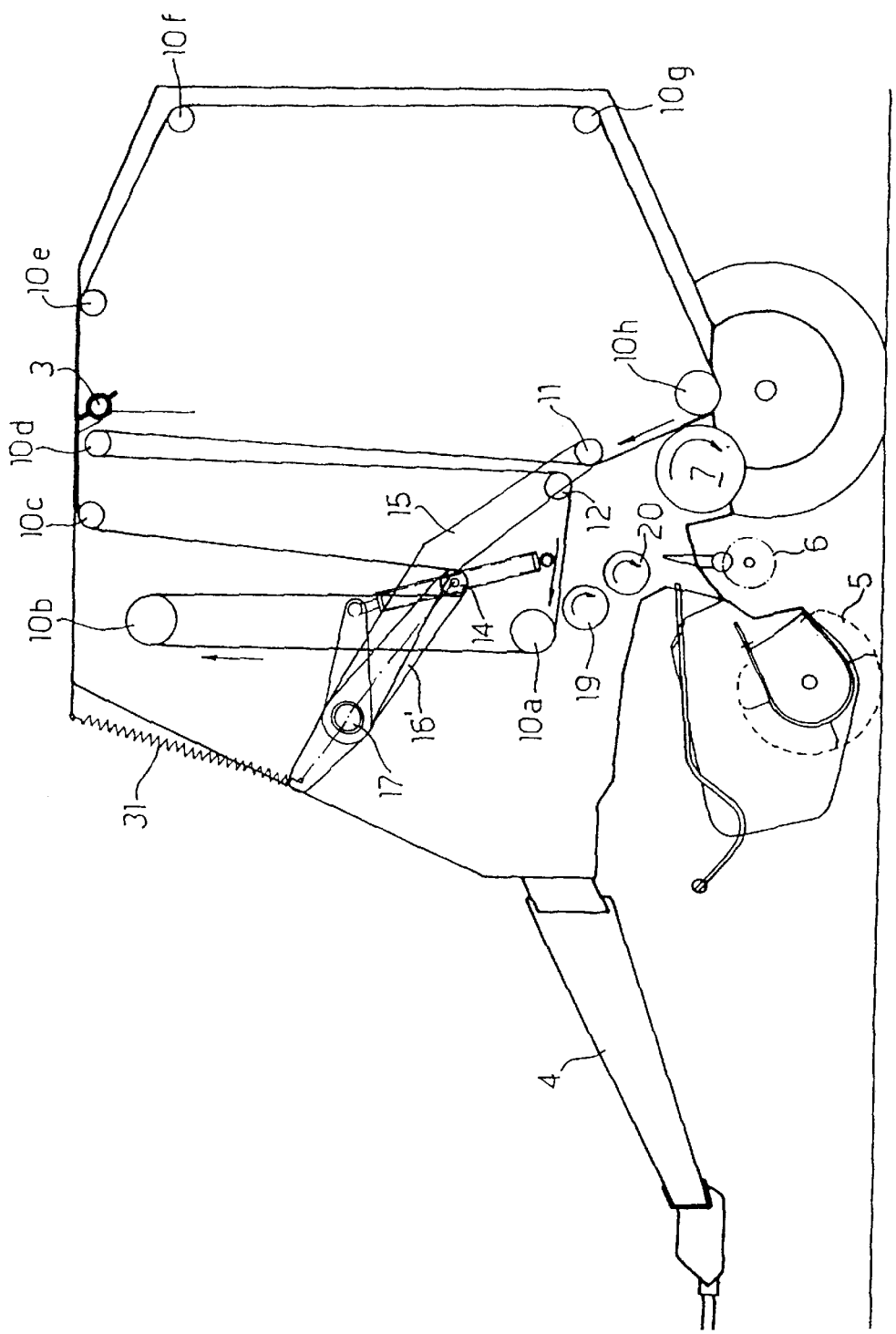
FIG. 5a is a second embodiment of the round baler of the invention in which both belt tensioners are hinged on a common axis, and wherein the machine's initial arrangement allows the formation of a bale having a hard core.
Figure 5B:
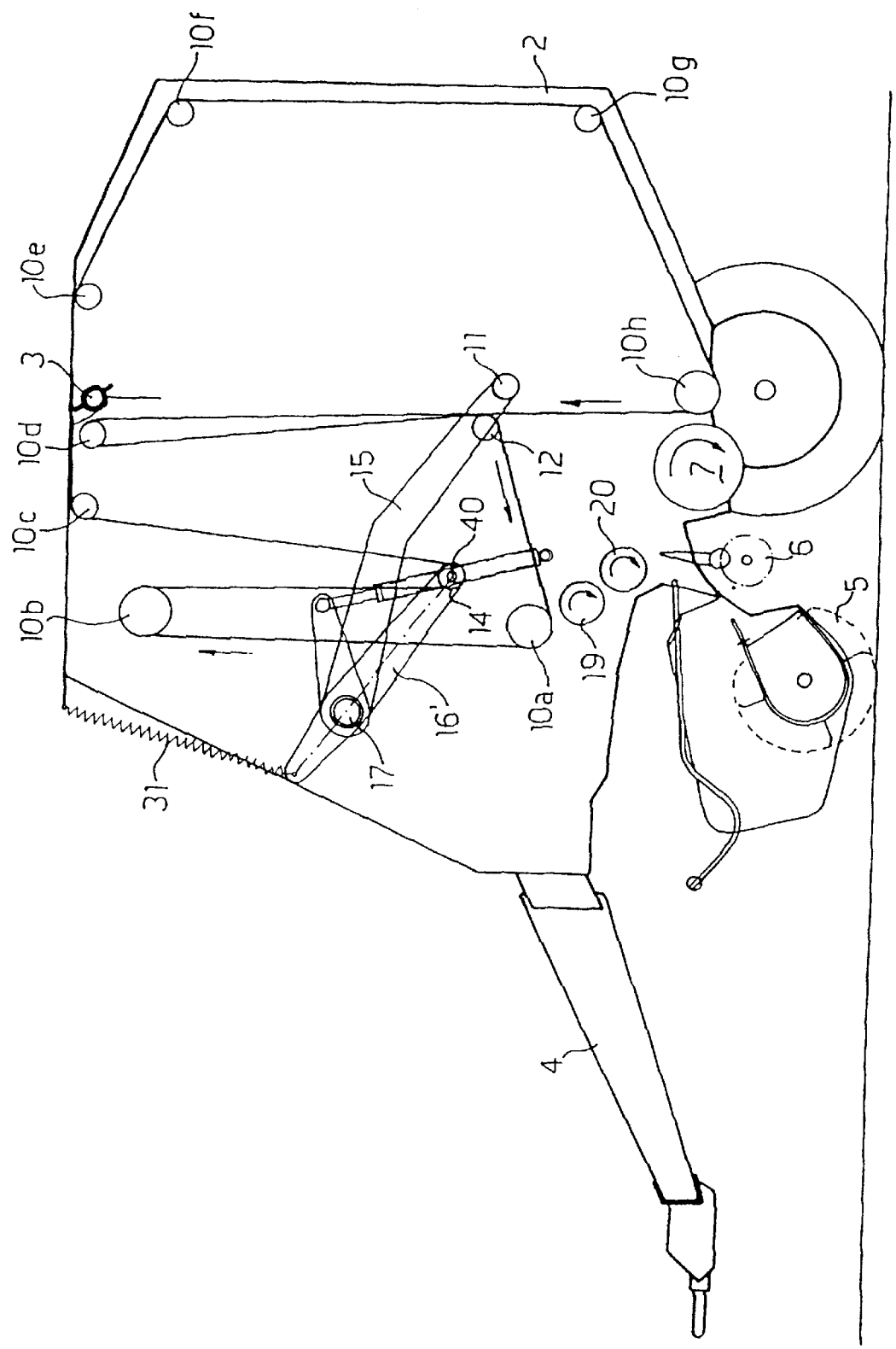
FIG. 5b shows the round baler of FIG. 5a, wherein the machine's arrangement is that corresponding to the formation of a bale having a soft core.

In FIGS. 5a and 5b, another embodiment of the round baler is illustrated.

The first belt tensioner 15 is rotatably mounted on the same axis 17 as the second belt tensioner 16'.

The second belt tensioner 16' is provided with a projection 40 on its opposite end with respect to where the spring acts. While this projection 40 remains in contact with the first arms 15, thereby acting as a stop, the bale may expand more easily overcoming only the force of the second belt tensioner 16' so that in the initial arrangement shown in FIG. 5b it will be possible to form a soft core. Alternatively, since the projection 40 already abuts the primary belt tensioner 15 in FIG. 5a, this arrangement or presetting is that which corresponds to FIG. 1a (first embodiment) for the formation of a hard core. This second embodiment shows that the position of the secondary belt tensioner 16' may be chosen in the present invention according to the application. The round baler of the present invention seeks to solve the problem of providing a versatile machine, allowing the formation of bales of hay, maize plants, straw, silage, etc., with different properties with respect to density (hard core, or soft core with variable diameter).

In a preferred embodiment of the invention there is provided three programs for bale compression, which are performed automatically by the electronic control unit.

The hydraulic circuit (FIGS. 7, 8, 9) controlled by the electronic control unit 50 (FIG. 6) will be described below. The presetting of the geometry of the bale core formation chamber is performed by closing, at a predetermined instant of time, an electrically controlled two-way valve 57 of the hydraulic circuit which stops the oil flow towards the hydraulic cylinder 21, which serve to compress the bale, when the hydraulic cylinder units 21 have reached the desired position.

This position is detected by the signal sent by a potentiometer.

The compression program with a constant pressure (acting through the hydraulic units 21) provides that the pressure of the hydraulic cylinder units 21 exerted on the bale by the belt 8 (starting from the condition shown in FIGS. 1b, 2b, 3b or 4b, when the second belt tensioner is lifted and the roll 14 is tangent to the belts 8) is constant until the bale has reached its maximum diameter (the diameter of the bale when the latter is discharged out of the round baler). This pressure may be preset in an interval comprised for instance between 80 and 220 bar.

The compression program with a constant pressure increase is characterized by the presetting of the initial value and final value of the pressure and of the final value of the bale diameter (diameter of the bale when the latter is discharged out of the round baler).

The pressure increases in a constant way from the initial to the final value once the product has filled the chamber (FIGS. 1b, 2b, 3b, 4b).

The compression program with variable pressure provides that two pressure values V1 and V2 are chosen. The value V1 acts after the bale core formation chamber has been completely filled and is maintained constant until the bale has reached a predetermined diameter (for example ⅔ of the maximum angular rotation amplitude of the primary belt tensioner)

Thereafter, the pressure V2 starts acting and this pressure remains constant until the bale is completed.

Figure 6:
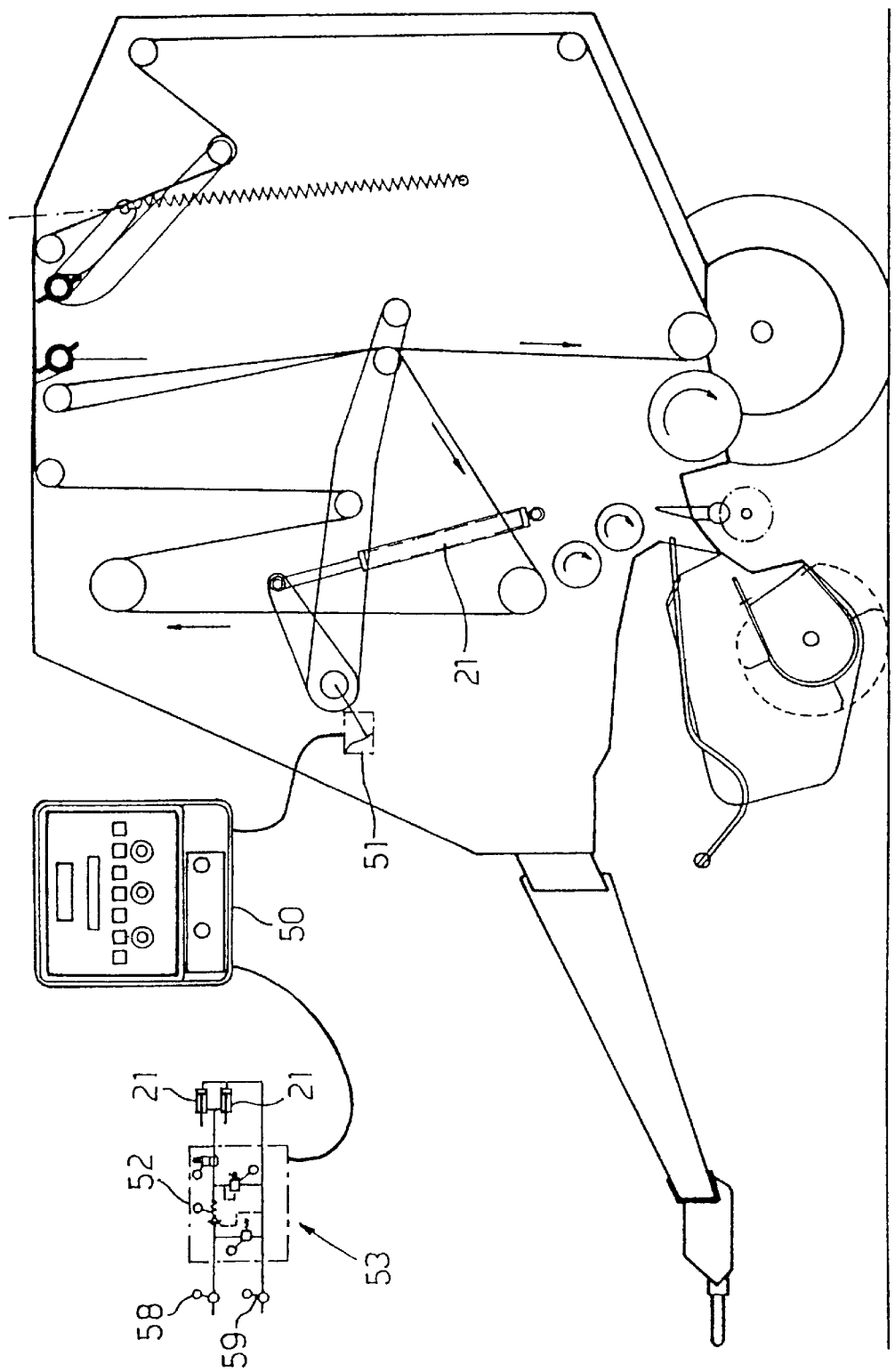
FIG. 6 is a sectional view of the round baler and a schematic illustration of the potentiometer, the electron control unit, and the electrically controlled hydraulic valve.
Figure 7:
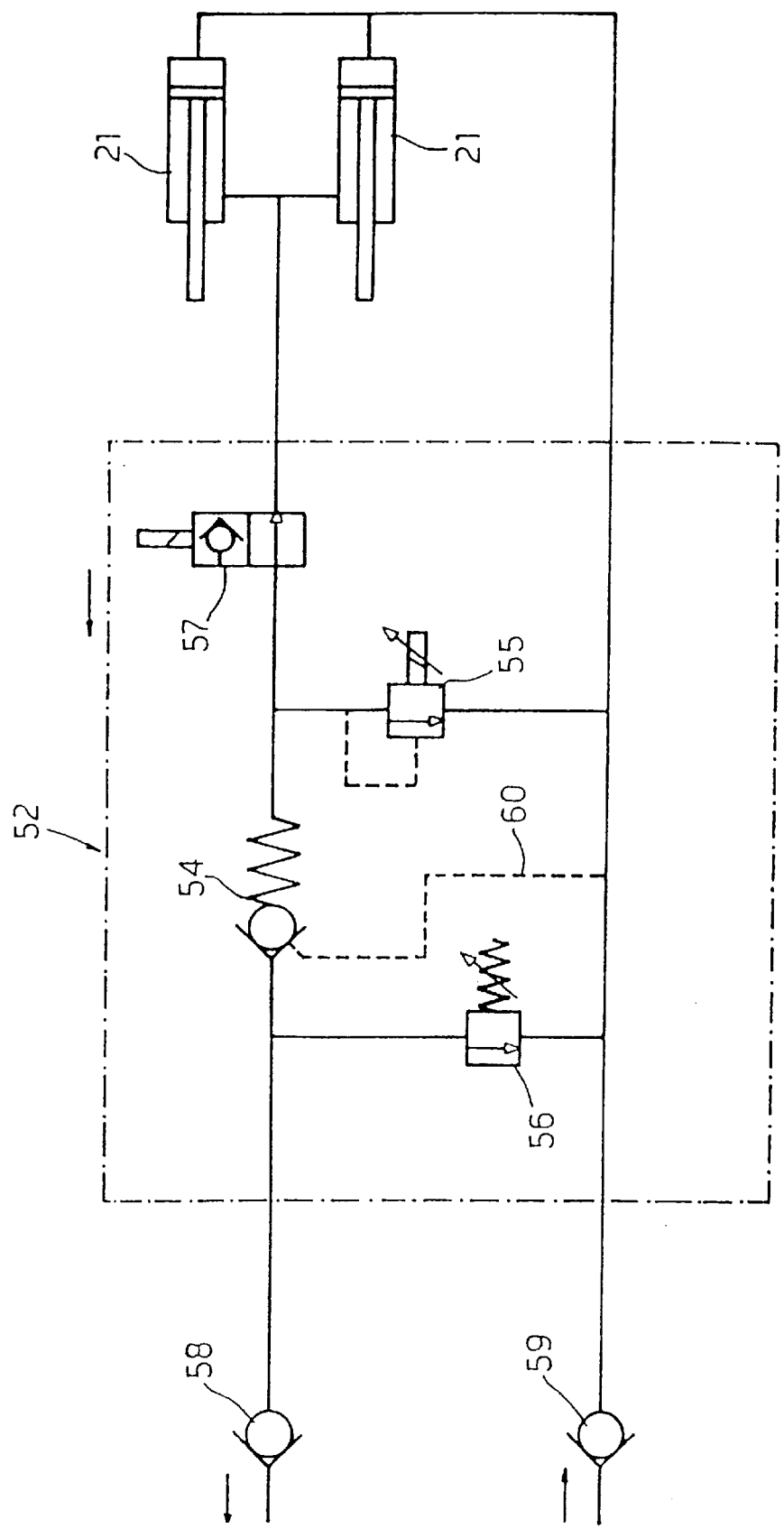
FIG. 7 is a diagram of the hydraulic circuit, the hydraulic cylinder units for displacing the primary belt tensioners, and the oil ports or oil intakes of the tractor, according to a first operative phase of the round baler.
Figure 8:
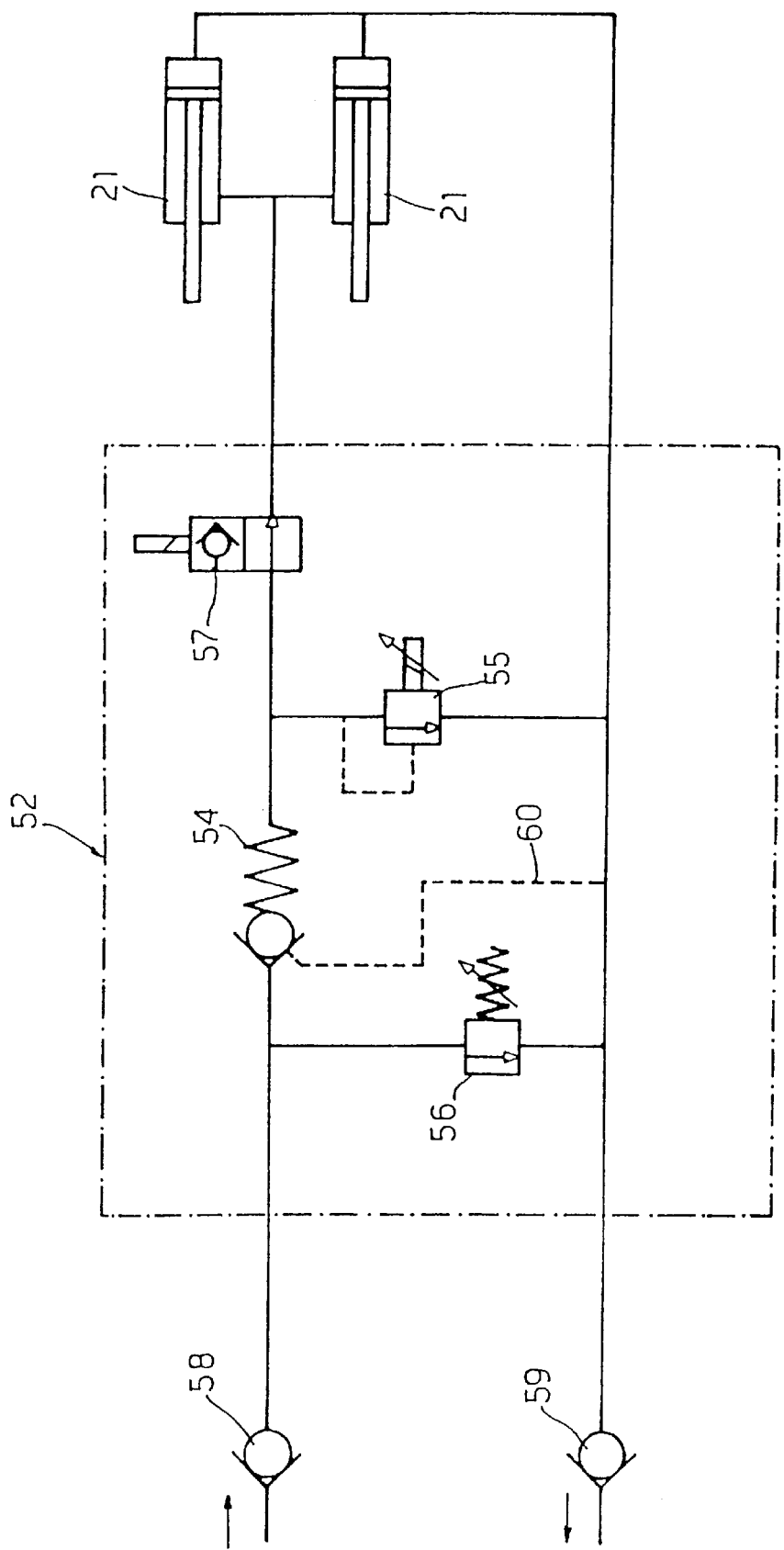
FIG. 8 is a diagram of the hydraulic circuit of FIG. 7, according to a second operative phase.
Figure 9:
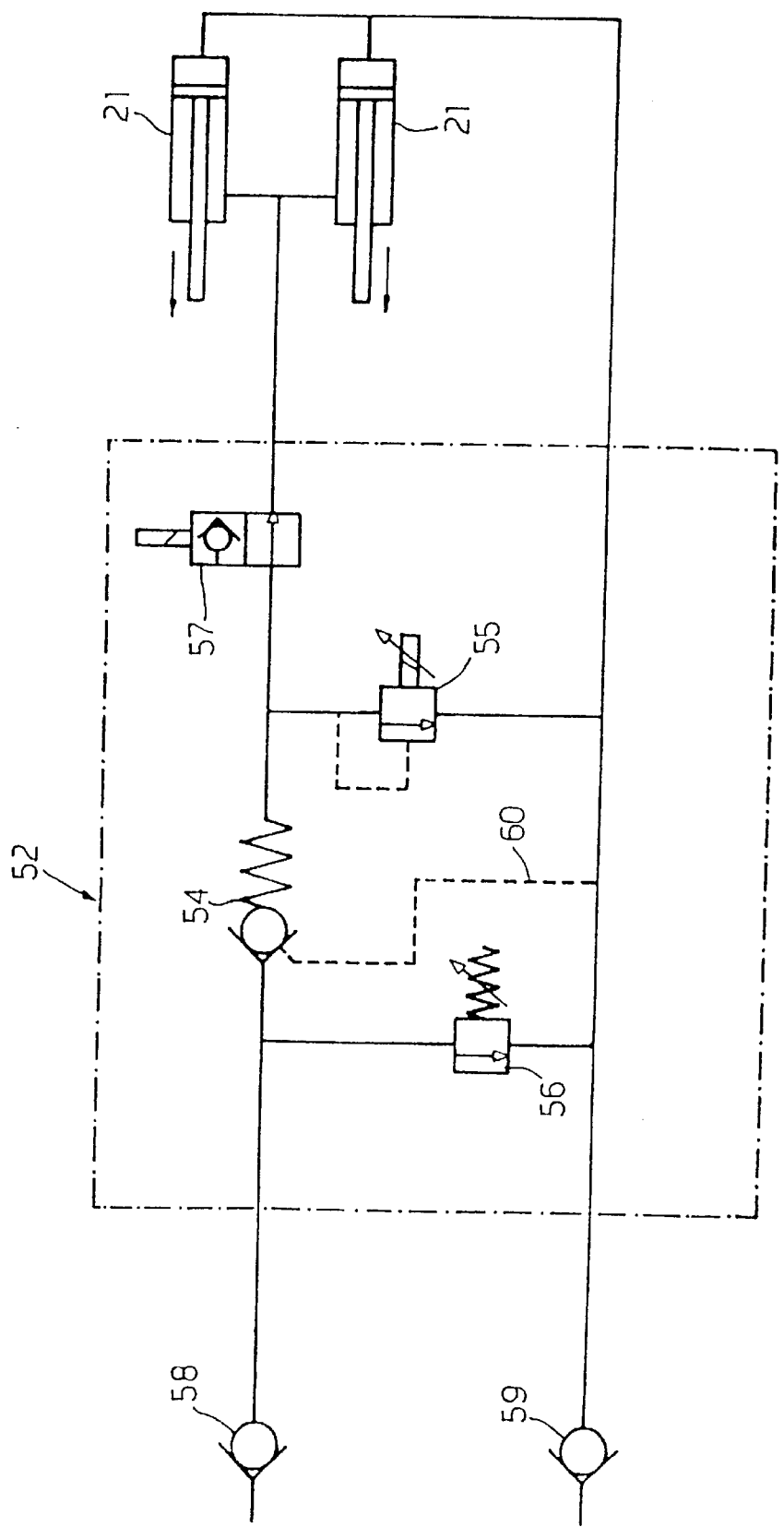
FIG. 9 is a diagram of the hydraulic circuit of FIG. 7, according to a third operative phase corresponding to the bale compression process.

The compression method makes use of various components, as shown in FIG. 6, that is an electronic control unit 50, a potentiometer 51, hydraulic cylinder units 21, and an electrically controlled hydraulic cylinder valve 52 included in the circuit 53 shown in FIGS. 7, 8, 9.

The electrically controlled hydraulic valve 52 is realized in a single block of metal and comprises a pilot-operated check valve 54, a proportional solenoid valve 55 for pressure control, a maximum pressure safety valve 56, and a two-position two-way electrically controlled valve 57. The electronic control unit 50 is usually located in the cab of the tractor in a position easily seen and operable by the user, who can choose and set different compression programs performed by the round baler.

The control unit 50 is supplied with 12V power and is managed by a microprocessor.

The potentiometer 51 is located on the round baler (FIG. 6) and is connected to the primary belt tensioner 15. Potentiometer 51 is suited to detect the position thereof during the rotation, from a minimum to a maximum allowed position.

In the following, the operation of the hydraulic circuit (FIGS. 7, 8, 9) will be described for the case of an intentional upward displacement of the primary belt tensioner 15 (FIG. 7), an intentional downward displacement (FIG. 8), and an induced displacement of the hydraulic cylinder units 21 caused by the bale expansion (compression method, FIG. 9).

With reference to FIG. 7, oil is drawn by an oil distributor or dispenser (not shown) of the tractor and is supplied to the circuit 53 of FIG. 6 through the oil intakes 58, 59 by moving a lever (not shown).

In the particular case of FIG. 7, oil enters through the oil intake 59, in the circuit 53 of FIG. 6 and supplies the hydraulic cylinder units 21, thereby extending the latter. Oil is discharged in the distributor through the two-position two-way electrically controlled valve 57 and through the pilot-operated check valve 54 which will be open since it is controlled by the delivery flow of oil through the conduit 60.

With reference to FIG. 8, which relates to the positioning of the primary belt tensioner 15 during its lowering to the predetermined position, the operator sets (chooses) by means of the electronic control unit 50 of FIG. 6, the initial position to be occupied by the primary belt tensioner 15 of FIG. 6.

Using the distributor of the tractor, by operating a lever, oil is supplied through the oil port or intake 58. This oil passes through the check valve 54, the valve 57, and acts on the cylinder units causing their retraction.

The cylinder units 21, when retracting, displaces the primary belt tensioner 15 which is connected to the potentiometer 51 of FIG. 6.

When the preset position is reached, according to a well defined voltage signal from the potentiometer 51, the electronic control unit controls the closing of the two-position two-way solenoid valve 57.

Then, the oil can no longer be supplied to the cylinder units 21 and is discharged through the maximum pressure safety valve 56. The oil flow inside the circuit 53 operates the hydraulic cylinder units (not shown) for closing the tailgate of the round baler.

FIG. 9 shows the compression process. That is, FIG. 9 shows the pressure control process inside the hydraulic circuit with the pressure acting against the extension of the hydraulic cylinder units 21 which control the displacement of the primary belt tensioner 15.

As above, three compression programs may be chosen:
constant pressure;
constant density; and
variable pressure (V1→V2).

The pressure inside the circuit is defined by the pressure control proportional solenoid valve 55.

Generally, a pressure control valve maintains the pressure inside a hydraulic circuit below a predetermined value. Usually it comprises a spring-loaded valve body which under normal conditions closes an oil passage hole. When reaching the calibration pressure defined by the force exerted by the spring on the valve body and by the useful cross-section of the passage, the hole is opened and oil passes through, the oil usually being directed towards the distributor of the hydraulic control unit.

Varying the preloading of the spring, for instance with a screw, the calibration pressure changes from a minimum to a maximum value.

In the proportional solenoid valve 55, corresponding to this specific situation, the preloading of the spring is effected by an electromagnet. Varying the supply current, the induced magnetic field is modified, and therefore the force pushing on an electromagnet which presses on the spring varies accordingly.

The control of the proportional solenoid valve is effected by means of a printed circuit board mounted on the block of the electrically controlled valve 52. The printed circuit board transforms a variable voltage signal, usually from 0 (zero) to 10 Volts, into a signal having a constant voltage and a variable current depending on the input voltage value.

The calibration pressure is thereby changed between a minimum and a maximum value according to the structural shape of the valve body.

Therefore, when a constant pressure compression process is chosen, a presetting of the operation pressure is performed on the electronic control unit 50.

The potentiometer sends voltage signals to the electronic control unit during the rotation of the primary belt tensioner 15, and this unit converts them into the voltage value (which is always the same in this case) corresponding to the required pressure value.

This signal is input in the printed circuit board (not shown) mounted on the electrically controlled valve 52, which maintains constant the pressure value in the hydraulic circuit.

In the situation shown in FIG. 9, oil does not pass through the oil ports or intakes 58, 59 and the pilot-operated check valve 54 stops the flow of oil displaced by the hydraulic cylinder units 21 under the action of the expanding bale so that oil may pass in a "controlled way" through the pressure control proportional solenoid valve 55 (once the calibration value has been reached).

When the constant density compression process is chosen, a presetting of the initial and final pressure values and of the bale diameter is performed on the electronic control unit 50.

The potentiometer 51, or an analog, digital or capacitive detector of linear or angular variations, sends voltage signals to the electronic control unit 50 during rotation of the primary belt tensioner 15, and this control unit processes these signals by means of the microprocessor and sends them to the printed circuit board of the electrically controlled hydraulic valve 52, which through the electromagnet modifies the preload of the spring on the valve body. In this way, it is possible to increase the pressure in a constant way from the initial value to the final value associated to the preset diameter. In the operation mode involving a variable pressure, two pressure values V1 and V2 are set on the electronic control unit 50, the desired value of the bale diameter and the initial geometry of the chamber.

The control unit will control the value 55 according to the pressure V1 until the potentiometer 51 transmits a signal corresponding to the position of the primary belt tensioner 15 between the minimum one (initial geometry of the chamber) and a second position calculated according to a desired ratio (for instance ⅔ of the rotation amplitude angle of the belt tensioner, referring to the preset diameter of the bale). Once this position of the primary belt tensioner is reached, the voltage signal of the potentiometer 51 is processed to obtain the pressure V2 which will remain constant until the bale is completed. Obviously, in the case of a compression with a constant pressure, the pressure control solenoid valve could be replaced by a mechanical pressure control valve with a spring which is loaded with a screw, since the preloading in this case does not change with time.

We claim:

1. A round baler for the formation of a soft or hard core bale comprising:
   a variable geometry bale core formation chamber defined by a set of belts, said belts being wound around a plurality of stationary rollers and movable belt tightening rollers, some of the stationary rollers being stationary driven rollers;
   primary belt tensioners and rotatable secondary belt tensioners;
   said movable rollers being mounted on at least one of said primary belt tensioners and on at least one of said secondary belt tensioners;
   a spring attached to each of said secondary belt tensioners, each of said springs being arranged to cause a corresponding secondary belt tensioner to exert a pressure on an associated belt;
   by control of a position of the primary belt tensioners, said primary belt tensioners defining an initial geometry of the bale core formation chamber;
   hydraulic cylinder units arranged and constructed to displace said primary belt tensioners;
   an electrical and hydraulic system with an electronic control unit arranged and constructed to provide an oil flow and an oil flow stoppage control to said hydraulic cylinder units;
   said secondary belt tensioners being arranged, for any position of said primary belt tensioners, to provide balance for tensile stress of said belts when said belts slacken;
   in a soft core formation configuration said secondary belt tensioners being arranged to cancel a hydraulic compression action of said primary belt tensioners being held stationary during a first bale compression phase, by exerting on said belts a pressure via said springs just sufficient to adhere said belts on said stationary driven rollers while said secondary belt tensioners complete a rotation.

2. The round baler of claim 1, further comprising a secondary belt tensioner roller attached to one of said secondary belt tensioners, wherein in a hard core formation configuration such that said primary belt tensioners are positioned in a lowest possible position, said secondary belt tensioner attached to said secondary belt tensioner roller is arranged and constructed such that said secondary belt tensioner roller is tangent to said belts, said spring associated with said primary belt tensioners are positioned such that said tensile stress of said spring is at a maximum, and two belt sections of said belts are in a maximum tensile stress condition as determined by a pressure in said hydraulic system.

3. The round baler of claim 1, wherein said primary belt tensioners are configured to be automatically positioned based on an electric signal sent by said electronic control unit.

4. The round baler of claim 1, wherein said primary belt tensioners are configured to be manually positioned based on stops associated with positioning said primary belt tensioners.

5. The round baler of claim 1, wherein said secondary belt tensioners are configured to be positioned by one of said springs and mixed mechanical/hydraulic devices, said secondary belt tensioners being positioned to increase bale compression by avoiding slackening and slipping of said belts.

6. The round baler of claim 1, wherein one of said secondary belt tensioners is mounted on a tailgate.

7. The round baler of claim wherein one of said secondary belt tensioners is mounted on a front stationary part of a machine body.

8. The round baler of claim 7, wherein said primary belt tensioners and said secondary belt tensioners are mounted on a same axis.

9. The round baler of claim 8, further comprising projections attached to said secondary belt tensioners so that said projections abut said primary belt tensioners so as to define a beginning of a compression phase of said hydraulic cylinder units.

10. The round baler of claim 9, wherein a hard core formation configuration provides said primary belts tensioners positioned in a lowest position and said projections abut said primary belt tensioners.

11. The round baler of claim 1, further comprising adjustors for adjusting a rotational angle of said belts, wherein adjusting the rotational angle provides a desired bale diameter.

12. The round baler of claim 11,further comprising means so that bales produced with a desired bale diameter are tied up at that desired bale diameter by one of wire, net, and plastic film.

13. The round baler of claim 1, further comprising:
   an operator selectable compression program to form a bale with one of a different density distribution core, a hard core, and a soft core;
   said compression program comprising a constant pressure, a variable pressure, and a gradually increasing pressure program.

14. The round baler of claim 13, wherein said compression program is operatively connected to said hydraulic circuit and said control unit to determine an initial position of said hydraulic cylinder units.

15. The round baler of claim 1, further comprising a constant pressure manually adjustable mechanical pressure control valve and mechanical stops disposed on lateral internal walls of the round baler, wherein adjustment of said mechanical pressure control valve permits an operator to form a bale with one of a different density distribution core, a hard core, and a soft core.

16. The round baler of claim 1, further comprising:

a position sensor mounted on one of the primary belt tensioners, said position sensor providing a voltage signal to said electronic control unit; and a pressure control proportional solenoid valve comprising an electromagnet, a spring arranged to be under a force of said electromagnet, and a valve body, wherein said electronic control unit is arranged and adapted to provide a signal to said electromagnet upon receipt of the voltage signal from said position sensor to change the force acting the upon said spring of said pressure control proportional solenoid valve.

17. The round baler of claim 16, wherein said position sensor is one of an analog, digital, and capacitive detector of angular or linear displacements, said position sensor being mounted on the round baler and operatively connected to one of said primary belt tensioners.

18. The round baler of claim 16, further comprising a valve arranged to stop the flow of oil to said hydraulic cylinder units at a predetermined time upon said position sensor indicating that said primary belt tensioner has been lower from a first position to a preset position corresponding to a selected geometry of said baler core formation chamber.

19. The round baler of claim 18, wherein said valve is an electrically controlled two-position two-way valve.

20. The round baler of claim 16, further comprising a pilot-operated check valve arranged to allow oil flow to said hydraulic cylinder units both during intentional lower and lifting, and arranged to stop oil flow to said hydraulic cylinder units and to direct oil flow through said pressure control proportional solenoid valve when said hydraulic cylinder units are displaced by bale expansion.

21. The round baler of claim 20, further comprising a maximum pressure valve adapted to allow the flow of oil to further hydraulic cylinder units operatively connected to a tailgate, said maximum pressure valve allowing the flow of oil to said further hydraulic cylinder units when said two-position two-way electrically controlled valve is closed.

22. A method of compressing a bale in a round baler having a primary and a secondary belt tensioner, a potentiometer position sensor to determine the position of the primary belt tensioner, a hydraulic circuit with a pressure control valve activated by a control unit through the signal of the position sensor to control pressure exerted on a bale being formed, said method comprising the steps of:

monitoring the position of the primary belt tensioner with the potentiometer position sensor;

providing voltage signals responsive to the position sensor monitoring of the position of the primary belt tensioner;

processing the provided voltage signals to obtain a voltage value;

transforming the obtained voltage value into a constant voltage and variable current signal; and with the variable current signal, controlling the pressure to be instantaneously exerted on the bale being formed by the round baler by activating an electromagnet of the pressure control valve to modify a preloading of a spring associated with a valve body of the pressure control valve.

* * * * *

UNITED STATES PATENT AND TRADEMARK OFFICE
CERTIFICATE OF CORRECTION

PATENT NO. : 6,079,324
DATED : June 27, 2000
INVENTOR(S) : Antonio Feraboli et al.

It is certified that error appears in the above-identified patent and that said Letters Patent is hereby corrected as shown below:

Title page,
Item [30], change "PM95A0505" to -- RM95A000505 --.

Column 10,
Line 27, after "claim" insert -- 1 --.

Signed and Sealed this

Eighteenth Day of September, 2001

Attest:

NICHOLAS P. GODICI
*Attesting Officer*     *Acting Director of the United States Patent and Trademark Office*